G. P. SISSON.
CORN-POPPER.

No. 186,279.  Patented Jan. 16, 1877.

WITNESSES
Nat. E. Oliphant
Geo. R. Porter

INVENTOR
George P. Sisson,
per Chas. H. Fowler,
Attorney.

UNITED STATES PATENT OFFICE.

GEORGE P. SISSON, OF NORTHAMPTON, MASSACHUSETTS, ASSIGNOR OF ONE-HALF HIS RIGHT TO OSMORE O. ROBERTS, OF SAME PLACE.

IMPROVEMENT IN CORN-POPPERS.

Specification forming part of Letters Patent No. 186,279, dated January 16, 1877; application filed December 11, 1876.

*To all whom it may concern:*

Be it known that I, GEORGE P. SISSON, of Northampton, in the county of Hampshire and State of Massachusetts, have invented a new and valuable Improvement in Corn-Poppers; and I do hereby declare that the following is a full, clear, and exact description of the construction and operation of the same, reference being had to the annexed drawings, making a part of this specification, and to the letters and figures of reference marked thereon.

Figure 1:
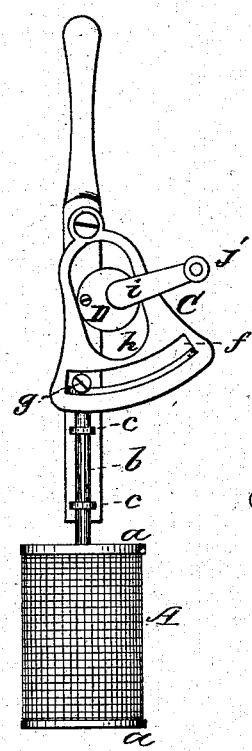
Figure 2:
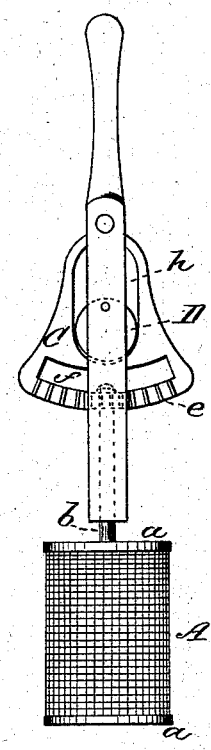
Figure 3:
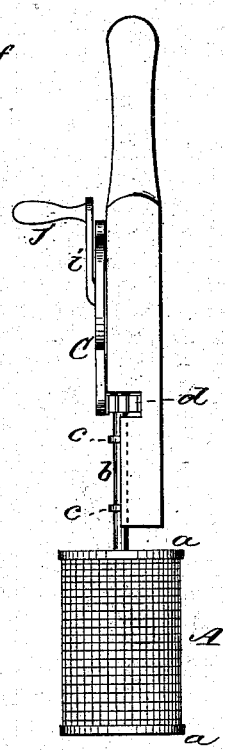

Figure 1 of the drawing is a representation of a side elevation of my invention. Fig. 2 is a similar view of the same. Fig. 3 is an end view.

Previous to my invention, so far as I am aware, the hoppers of corn-poppers have had a continuous rotary motion imparted to them by suitable mechanism constructed for the purpose, and when it was found necessary to change the motion from a rotary to a reciprocating rotary motion the crank or driving shaft had also to have the same motion back and forth, which made the operation, when done by hand, very tiresome.

The object and purpose of my invention, therefore, is to so construct the operating mechanism that by the simple rotation of the crank-handle or driving-shaft the hopper will receive a reciprocating rotary motion, and thereby greatly facilitate the operation of popping, and make it less tedious to the attendant.

In the accompanying drawings, A represents a cylinder or hopper, preferably of wire-gauze, to the ends of which are secured suitable heads *a*, the upper one having rigidly connected thereto a rod, *b*, secured within a groove in the lower portion of a handle, B, by suitable staples *c*, to allow the free working of the rod within said groove when acted upon by the operating mechanism. Upon the upper end of this rod is a gear-wheel, *d*, the teeth of which mesh with teeth *e* upon the inner face of a pivoted plate, C, the same having a curved slot, *f*, working over a guide rod or pin, *g*. The plate C is also formed with a vertically-elongated slot, *h*, for the reception of an eccentric, D, which is pivoted to the lower portion of the handle, and is formed with an arm, *i*, to which is suitably connected a crank-handle, *j*.

It will be seen that by simply rotating the eccentric D by the handle *j* the periphery thereof will be brought to bear against the edge of the elongated slot *h*, and cause a vibratory motion of the plate C, and which, by the cogs or teeth thereon meshing with the teeth upon the wheel *d*, will cause the hopper A to have a continuous reciprocating rotary motion, thereby greatly facilitating the popping of the corn without the danger of it becoming injured by scorching or burning.

If desired, one of the heads of the hopper may be made removable, or a hinged door may be formed in the wire-gauze, for filling and withdrawing the corn from the hopper; and I wish it understood that I do not desire to confine myself to the operation of the hopper by hand, as suitable belts and pulleys, or other mechanical means, may be employed to rotate the eccentric within the slotted plate than those shown and described without, in the least, departing from what constitutes the essence of my invention.

Having now fully described my invention, what I claim as new, and desire to secure by Letters Patent, is—

1. A corn-popper in which the hopper thereof has a reciprocating rotary motion imparted to it by a complete rotation of the operating shaft or lever, substantially as and for the purpose described.

2. The hopper A, with rod *b* and gear-wheel *d*, in combination with pivoted plate C, having slot *h* and teeth *e*, and the eccentric D, constructed to operate substantially as set forth.

In testimony that I claim the above I have hereunto subscribed my name in the presence of two witnesses.

GEORGE P. SISSON.

Witnesses:
OLIVER WALKER,
A. L. THAYER.